United States Patent [19]
Ray

[11] Patent Number: 5,478,024
[45] Date of Patent: Dec. 26, 1995

[54] TENSION REDUCING RETRACTOR WITH AN ENERGY ABSORBING DEVICE

[75] Inventor: Gary M. Ray, Royal Oak, Mich.

[73] Assignee: TRW Vehicle Safety Systems Inc., Lyndhurst, Ohio

[21] Appl. No.: 237,820

[22] Filed: May 4, 1994

[51] Int. Cl.⁶ ................................................. B60R 22/44
[52] U.S. Cl. ................................................. 242/372
[58] Field of Search ........................... 242/372; 280/806; 297/478, 480

[56] References Cited

U.S. PATENT DOCUMENTS

| | | |
|---|---|---|
| 4,026,494 | 5/1977 | Tanaka . |
| 4,162,772 | 7/1979 | Shimogawa et al. . |
| 4,213,580 | 7/1980 | Kawaharazaki et al. . |
| 4,215,830 | 8/1980 | Cunningham . |
| 4,303,208 | 12/1981 | Tanaka . |
| 4,568,037 | 2/1986 | Kawaguchi et al. ............ 242/372 |
| 4,711,408 | 12/1987 | Mori . |
| 4,913,372 | 4/1990 | Takada ............................ 242/372 |
| 5,080,298 | 1/1992 | Sasaki et al. . |
| 5,165,621 | 11/1992 | Mizuno et al. .................. 242/372 |
| 5,195,693 | 3/1993 | Sasaki et al. .................... 242/372 |
| 5,255,868 | 10/1993 | Reulein . |

Primary Examiner—Daniel P. Stodola
Assistant Examiner—John P. Darling
Attorney, Agent, or Firm—Tarolli, Sundheim & Covell

[57] ABSTRACT

A seat belt retractor (10) includes a seat belt webbing storage spool (14) that is rotatable in winding (retraction) and unwinding (withdrawal) directions. First and second springs (50 and 52) bias the spool (14) in the retraction direction and are stressed upon rotation of the spool in the belt withdrawal direction. A connector (54) interconnects the first and second springs (50 and 52). The connector has first and second portions (66 and 64) which are movable relative to each other. The first portion (66) is connected to the first spring (50), and the second portion (64) is connected to the second spring (52). An actuatable mechanism (56), when actuated, blocks rotation of the second portion (64) of the connector (54) in the belt retraction direction to block the spring force of the first spring (50) from acting through the second spring (52) and on the spool (14). The actuatable mechanism (56), when deactivated, releases the second portion (64) of the connector (54) to permit the first spring (50) to apply force through the connector (54) and the second spring (52) to the spool (14). The connector (54) includes a mechanism which acts between the first and second portions (66 and 64) for damping the force applied to the second spring (52) by the first spring (50) upon deactivation of the actuatable mechanism (56).

21 Claims, 6 Drawing Sheets

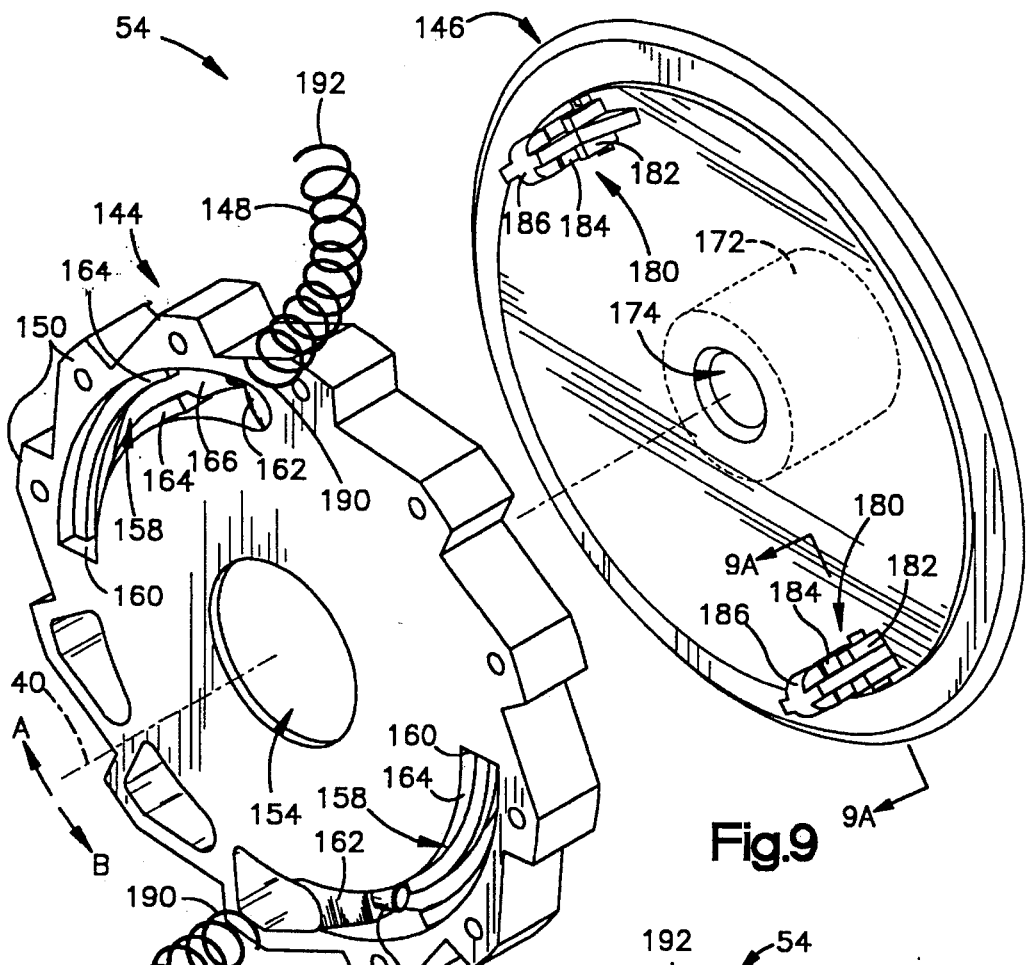
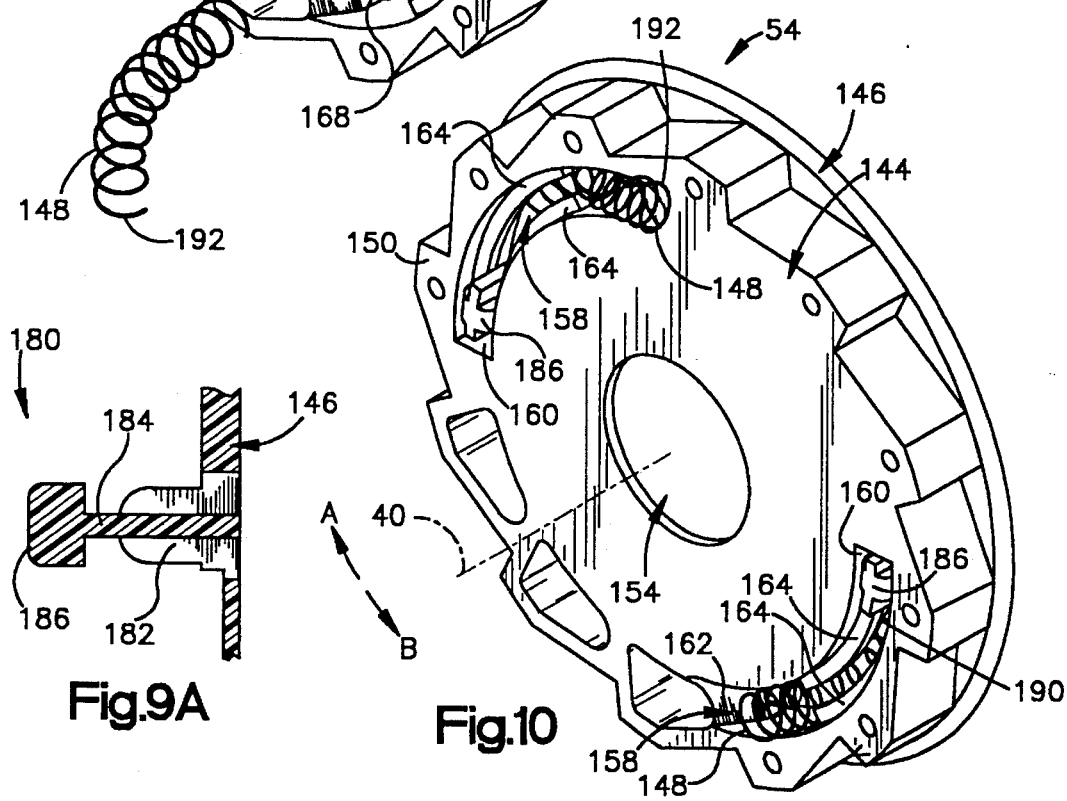

TENSION REDUCING RETRACTOR WITH AN ENERGY ABSORBING DEVICE

BACKGROUND OF THE INVENTION

The present invention relates to a vehicle seat belt retractor which has a tension reducing mechanism for increasing the comfort of a vehicle occupant wearing seat belt webbing which is associated with the seat belt retractor.

A known seat belt retractor has two springs for biasing a seat belt webbing storage spool to rotate in a seat belt webbing retraction direction relative to a retractor frame. The two springs are connected in series with a ratchet wheel interposed between the two springs. One end of the first spring is fixed relative to the retractor frame and the other end is attached to act on the ratchet wheel. One end of the second spring is attached to the ratchet wheel and the other end is attached to act on the spool. Upon withdrawal of stored seat belt webbing from the spool, the first and second springs are stressed and the ratchet wheel is rotated in a seat belt webbing withdrawal direction.

The retractor has a comfort mechanism which is actuatable to block rotation of the ratchet wheel relative to the frame in the seat belt webbing retraction direction. Thus, when the comfort mechanism is actuated, only the spring force of the second spring is applied to bias the spool. This is a comfort setting in which a reduced tension is placed upon the seat belt webbing. Thus, the seat belt webbing applies a reduced tension to the vehicle occupant. The reduced tension increases the comfort of the vehicle occupant.

The first spring has a stronger spring force than the second spring. When the comfort setting is released and the ratchet wheel is permitted to rotate in the retraction direction, the first spring drives the ratchet wheel. The rotating ratchet wheel winds the second spring as a result of the larger spring force of the first spring being applied to the weaker second spring. If sufficient stress is present in the first spring, the second spring may be wound solid. Repeated impact of the force of the first spring on the second spring may cause unnecessary stress in the second spring.

SUMMARY OF THE INVENTION

The present invention is a seat belt retractor which can provide a reduced tension in seat belt webbing. The retractor includes a spool for storing seat belt webbing which is used as a restraint for a vehicle occupant. The spool is supported for rotation about an axis in seat belt retraction and seat belt withdrawal directions. First and second springs bias the spool for rotation in the belt retraction direction and are stressed upon rotation of the spool in the belt withdrawal direction.

The retractor includes a connector which interconnects the first and second springs. The connector has first and second portions that are movable relative to each other. The first portion is connected to the first spring, and the second portion is Connected to the second spring. The retractor includes an actuatable means for, when actuated, blocking rotation of the second portion of the connector in the belt retraction direction to block the spring force of said first spring from acting through the second spring and on the spool. The actuatable means, when deactivated, releases the second portion of the connector to permit the first spring to apply force through the connector and the second spring to the spool. The connector includes a means acting between the first and second portions for damping the force applied to the second spring by the first spring upon deactivation of the actuatable means.

BRIEF DESCRIPTION OF THE DRAWINGS

Further features of the present invention will become apparent to those skilled in the art to which the present invention relates from reading the following specification with reference to the accompanying drawings, in which:

FIG. 9 is a reverse angle exploded perspective view of the parts shown in FIG. 8;

FIG. 9A is a partial sectional view taken along line 9A—9A of FIG. 9;

FIG. 10 shows an assembly step for construction of the third embodiment;

DESCRIPTION OF PREFERRED EMBODIMENTS

Figure 1:
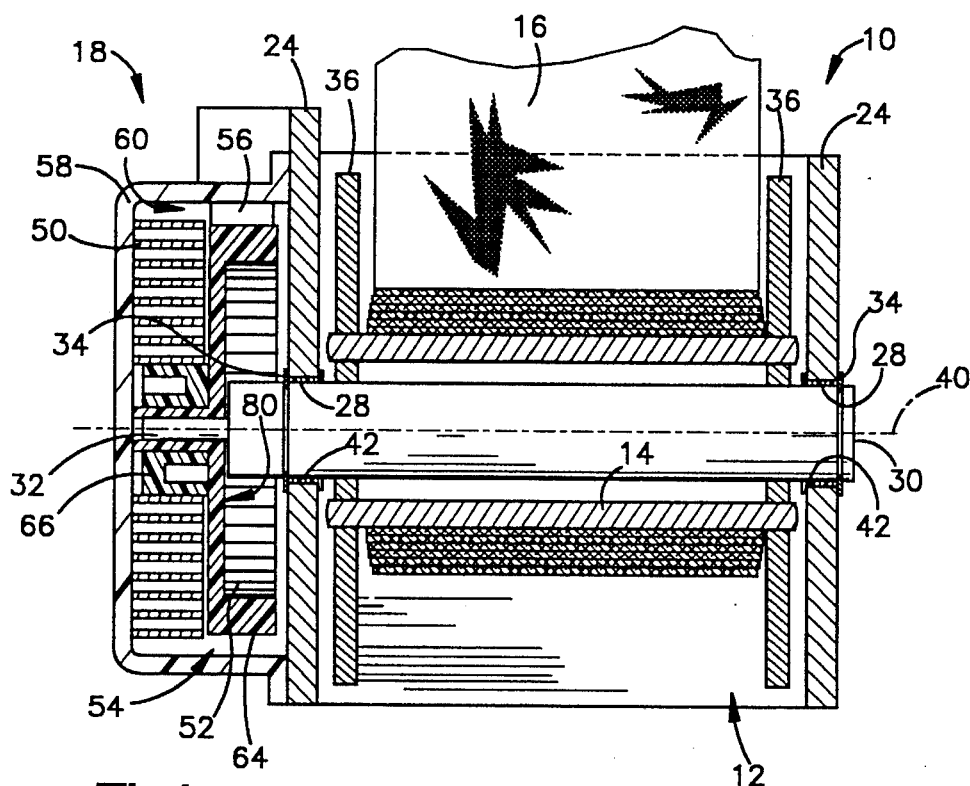
FIG. 1 is a sectional view of a seat belt retractor according to the present invention.

A seat belt retractor 10 according to the present invention is shown in FIG. 1. The seat belt retractor includes a frame 12, a storage spool 14 supported for rotation relative to the frame 12, a length of seat belt webbing 16 wound onto the spool 14, and a drive mechanism 18.

The spool 14 is fixed for rotation about an axis 40 with, and is coaxial with, a cylindrical shaft 30. The shaft 30 has a shaft extension 32. The shaft 30 extends through circular openings 28 in opposed sides 24 of the frame 12. The shaft 30 is supported in the openings 28 by bearings 42. Retainers 34 engage the shaft 30 to prevent axial movement of the shaft 30 relative to the frame 12.

Figure 2:
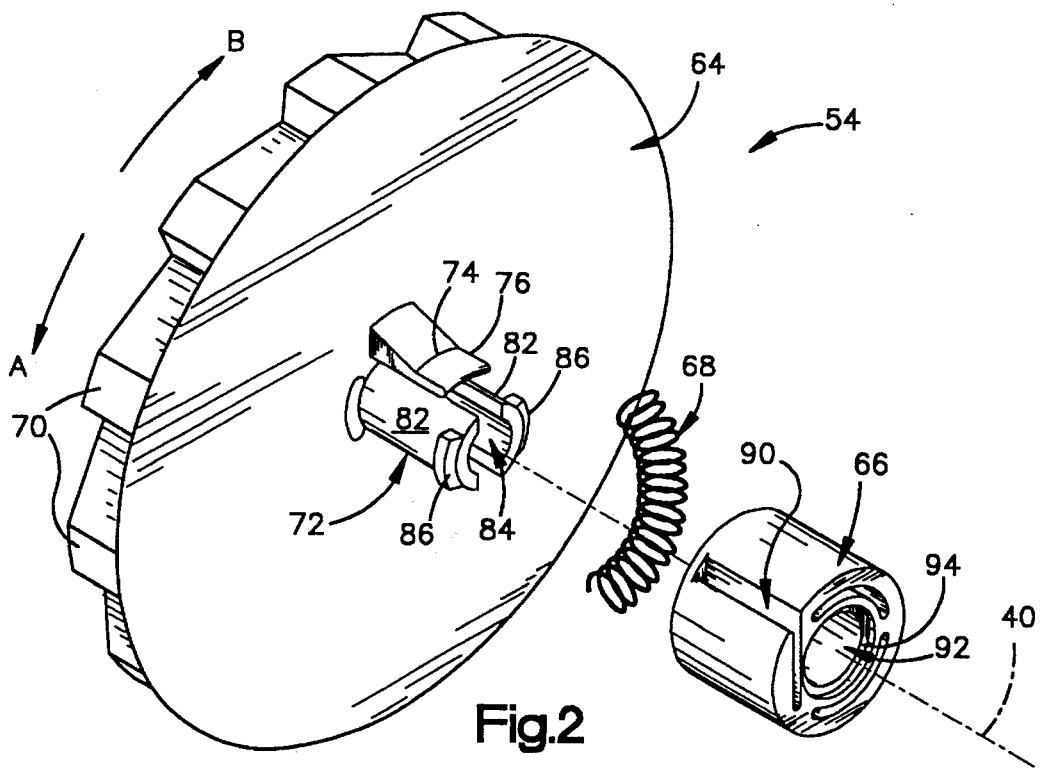
FIG. 2 is an exploded perspective view of a portion of the retractor of FIG. 1, with certain parts removed for clarity.

The spool 14 is rotatable in a seat belt winding (retraction) direction A (FIG. 2) and a seat belt withdrawal direction B (FIG. 2). A pair of spool locking, toothed metal ratchet wheels 36 (FIG. 1) are fixed to the spool 14 and rotate with the spool 14. A metal locking pawl (not shown) is pivotally mounted for engagement with the ratchet wheels 36 to block rotation of the spool 14 in the withdrawal direction B. A mechanism (not shown), such as an inertia mass sensor assembly, causes the locking pawl to engage the ratchet wheels 36 upon the occurrence of a sudden vehicle deceleration.

The drive mechanism 18 provides a force biasing the storage spool 14 for rotation in the winding direction A. The drive mechanism 18 includes a first spring 50, a second spring 52, a ratchet 54, a blocking mechanism 56 having a ratchet engaging pawl (not shown) and a solenoid (not shown), and a cover 58. The cover 58 can be made of either molded plastic or Stamped metal and is fixed relative to the frame 12. The first spring 50, the second spring 52, the ratchet 54 and the blocking mechanism 56 are located within a hollow interior 60 of the cover 58 and are between the cover 58 and one of the leg portions 24 of the frame 12.

The ratchet 54 is coaxial with the spool 14, and includes a wheel 64 (FIG. 2), a hub 66 and a compression spring 68. The wheel 64 is made of molded plastic, and has a plurality of teeth 70, a spindle 72 and a tab 74. The plurality of teeth 70 extend in an annular array about the outer periphery of the wheel 64 and define a hollow interior 80 (FIG. 1) of the wheel. The hollow interior 80 faces toward the spool 14. The spindle 72 (FIG. 2) is axially centered on the wheel 64. The spindle 72 extends axially away from the side of the wheel 64 opposite the hollow interior 80.

Figure 3:
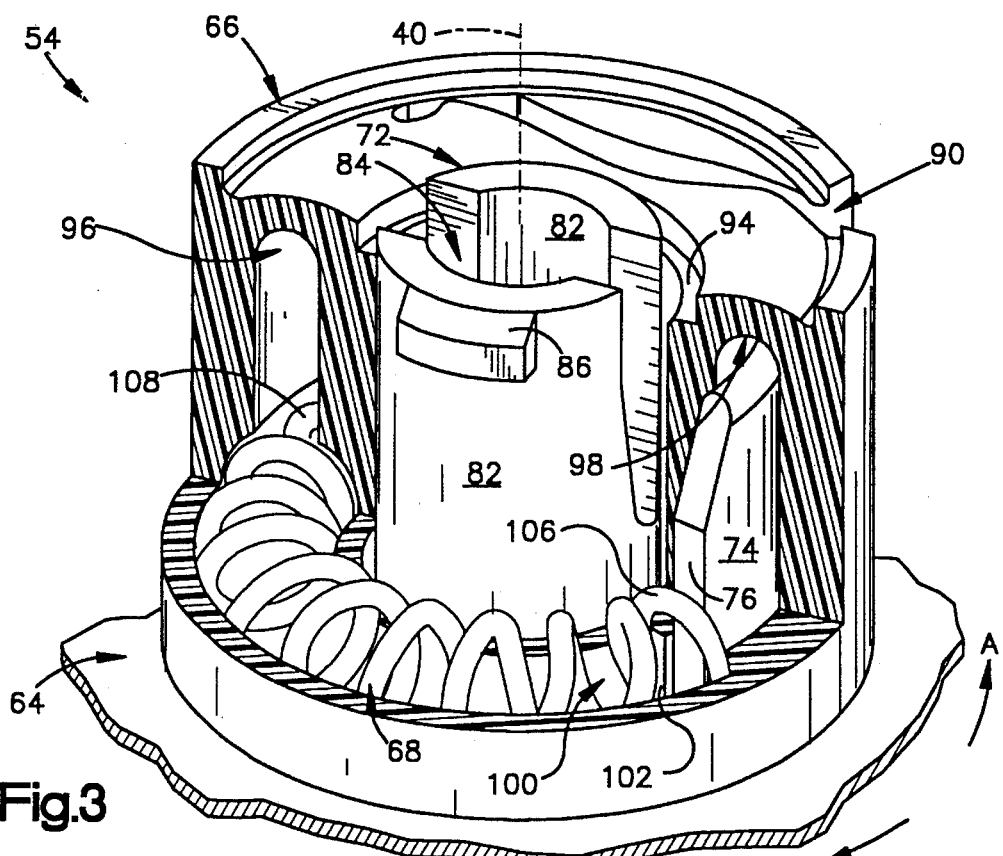
FIG. 3 is a partial sectional view of the portion of the retractor shown in FIG. 2, assembled, with parts in a first operational position.

The spindle 72 is bifurcated and includes two resilient fingers 82. The fingers 82 define an axially extending apertures 84. A retaining lip 86 is located at an axial end of each finger 82. The shaft extension 32 extends into the aperture 84 in the spindle 72 and supports the ratchet 54 for rotation relative to the shaft extension 32. The tab 74 is located adjacent to the spindle 72 and extends parallel to the spindle 72. The tab 74 has an engagement surface 76 (FIG. 3).

The hub 66 (FIG. 2) is co-axial with the wheel 64 and is generally cylindrical in shape. The hub 66 is made of molded plastic and has a spring retainer slot 90, a central aperture 92, a step recess 94 and a semi-annular slot 96 (FIG. 3). The spring retainer slot 90 (FIG. 2) extends parallel to the axis 40 and partially through the hub 66 along a geometric chord line. The aperture 92 extends through the hub 66 along the axis 40. The step recess 94 extends around the aperture 92 and is located on an axial end of the hub 66 which faces away from the wheel 64.

The semi-annular slot 96 (FIG. 3) extends into the hub 66 from an axial end of the hub 66 which faces toward the wheel 64. The semi-annular slot 96 extends in an arc about the axis 40, and includes a tab section 98 and a spring section 100. The tab section 98 and the spring section 100 are adjoining. The tab section 98 extends approximately one-eighth of the distance around the axis and is shaped to receive the tab 74. The hub 66 has abutment surfaces 102 (only one shown) at the ends of the spring section 100. The spring section 100 extends approximately halfway around the axis 40 and is shaped to receive the spring 68 and the tab 74.

Figure 4:
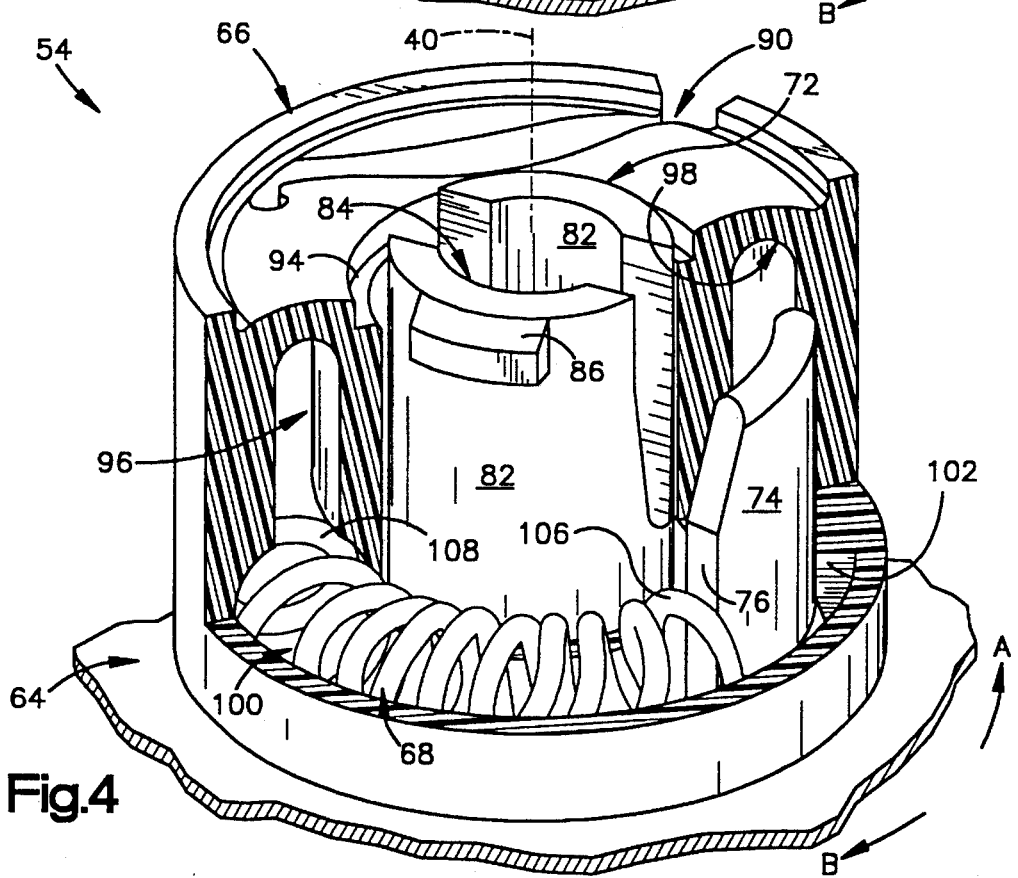
FIG. 4 is a partial sectional view similar to FIG. 3 with parts in a second operational position.

The hub 66 is positioned on the wheel 64 such that the spindle 72 extends through the aperture 92 of the hub 66. The tab 74 of the wheel 64 extends into the semi-annular slot 96. During installation of the hub 66 onto the wheel 64, the resilient fingers 82 are deflected radially inwardly and snap outwardly such that the retaining lips 86 rest in the step recess 94. The retaining lips 86 retain the hub 66 with the wheel 64 and prevent axial movement of the hub 66 relative to the wheel 64. The hub 66 is supported on the spindle 72 for limited relative rotation (FIGS. 3 and 4). During rotation of the hub 66 relative to the wheel 64, the tab 74 moves along the semi-annular slot 96.

The compression spring 68 is made of metal wire coiled into a helix, and has a first end portion 106 and a second end portion 108. The compression spring 68 is located in the spring section 100 of the semi-annular slot 96 so that it is slightly compressed along its extent. The wheel 64 traps the compression spring 68 within the semi-annular slot 96. In a rest position (FIG. 3), the compression spring 68 rests against the abutment surfaces 102 (only one shown) of the hub 66 and holds the tab 74 in the tab section 98 of the semi-annular slot 96. Thus, the compression spring 68 biases the wheel 64 and the hub 66 to the rest position.

If the hub 66 rotates in the belt winding direction A relative to the wheel 64 (FIG. 4), away from the rest position, the engagement surface 76 on the tab 74 bears upon the first end portion 106 of the compression spring 68. The compression spring 68 is compressed along its extent between the engagement surface 76 and the abutment surface (not shown) adjacent to the second end portion 108 of the compression spring 108. Compression of the compression spring 68 increases the biasing force of the spring 68 which tends to bias the hub 66 in the belt withdrawal direction B relative to the wheel 64.

Each of the first and second springs 50 and 52 (FIG. 1) is a spiral coil spring, with a plurality of coils, made of spring steel. Each of the first and second springs 50 and 52 has a first end (not shown) located at its respective outer end and a second end (not shown) located at its respective inner end. The first spring 50 is stronger than the second spring 52 and provides a relatively greater spring force.

The first and second springs 50 and 52 are disposed co-axially about the axis 40 with the ratchet 54. The first spring 50 is located concentrically about the hub 66. The first end (not shown) of the first spring 50 is affixed to the cover 58 by a fastener (not shown). Thus, the first end of the first spring 50 is fixed relative to the frame 12. The second end (not shown) of the first spring 50 is located within the spring retainer slot 90 (FIG. 2) of the hub 66. Thus, the second end of the first spring 50 is fixed for rotation with the hub 66.

The second spring 52 (FIG. 1) is located concentrically about the shaft 30 and within hollow interior 80 of the wheel 64. The first end (not shown) of the second spring 52 is affixed to the wheel 64 in the hollow interior 80 by a fastener (not shown). Thus, the first end of the second spring 52 is fixed for rotation with the wheel 64. The second end (not shown) of the second spring 52 is affixed to the shaft 30 by a fastener (not shown). Thus, the second end of the second spring 52 is fixed for rotation with the shaft 30.

The first and second springs 50 and 52 are connected in series, through the ratchet 54, to bias the spool 14 to rotate in the winding direction A. When the belt webbing 16 is withdrawn from the spool 14, the spool 14 is rotated in the withdrawal direction B. Rotation of the spool 14 in the withdrawal direction B causes the coils of the second spring 52 to tighten against the shaft 30.

As the second spring 52 is tightened, the ratchet 54 is biased to rotate about the axis 40 in the withdrawal direction B. When the ratchet 54 is rotated in the withdrawal direction B, the first spring 50 is tightened against the hub 66. Thus, as the belt webbing 16 is withdrawn, the first and second springs 50 and 52 provide an increasing combined spring force for biasing the spool 14 to rotate in the winding direction A. During withdrawal of the belt webbing 16, the ratchet 54 rotates substantially as a unit, without substantial relative rotation between the wheel 64 and the hub 66.

The blocking mechanism 56 includes a pivotable pawl (not shown) and an electrically activatable solenoid (not shown). The solenoid is activated in response to a condition in the vehicle, such as securing (buckling) the belt webbing 16 across the vehicle occupant. Activation of the solenoid actuates the blocking mechanism 56 by pivoting the pawl into blocking engagement with one of the teeth 70.

The blocking mechanism 56 blocks rotation of the ratchet 54 as a unit in the winding direction A, and prevents the first spring 50 from biasing the spool 14 in the winding direction A. Thus, the ratchet 54 and the blocking mechanism 56 provide a comfort setting in which only the second spring 52 acts to bias the spool in the winding direction A. When the retractor 10 is in the comfort setting, a reduced tension force is transmitted by the belt webbing 16 to the vehicle occupant because only the second spring 52, which is a relatively weak spring, acts to bias the spool 14.

To achieve the comfort setting, the vehicle occupant withdraws a first length of belting webbing 16. As the webbing 16 is withdrawn, both the first and second springs 50 and 52 are tightened. Once a sufficient length of belt webbing 16 is withdrawn, the vehicle occupant secures the belt webbing 16, as by buckling, across the vehicle occupant. Upon securing the belt webbing 16, the blocking mechanism 56 is actuated.

Generally, when a vehicle occupant withdraws the first length of belt webbing 16, a slight excess of belt webbing 16 is withdrawn. This slight excess of belt webbing 16 is wound back on to the spool 14 due to the bias of the second spring 52 after buckling.

If movement of the vehicle occupant, such as reaching to unlock an opposite door, necessitates that additional belt webbing 16 be withdrawn from the spool 14, such additional belt webbing 16 is provided by rotation of the spool 14 in the withdrawal direction B, and rotation of the ratchet 54 in the withdrawal direction B if the second spring 52 is wound tight. The sloped surfaces of the teeth 70 on the ratchet wheel 64 ensure that the ratchet 54 can rotate in the withdrawal direction B, even if the blocking mechanism 56 is actuated, due to sliding of the pawl (not shown) along the sloped surfaces.

Upon unbuckling of the belt webbing 16, the blocking mechanism 56 releases the ratchet 54. If sufficient tension is present, in the first spring 50, the first spring 50 will drive the ratchet 54 to rotate as a unit and tighten the second spring 52. The first spring 50 can drive and tighten the second spring 50 such that the second spring 52 will tend to wind toward a solid, fully-stressed position. Moreover, during rotation of the ratchet 54 by the first spring 50, the ratchet 54 develops rotational inertia. The design of the ratchet 54 ensures that an unnecessary stress impact is not transmitted to the second spring 52 by the first spring 50.

When the second spring 52 is driven to a fully-tightened position, rotation of the wheel 64 is stopped. However, the hub 66, which is driven by the first spring 50 and rotational inertia, can continue to rotate. Rotation of the hub 66 relative to the wheel 64 causes the tab 74 to move (FIG. 4) in the semi-annular slot 96 relative to the hub 66 away from the rest position. The engagement surface 76 of the tab 74 presses against the first end portion 106 of the compression spring 68.

The compression spring 68 is compressed and stressed to absorb and store energy. The first end 106 of the compression spring 68 is moved away from the adjacent abutment surface 102. Thus, a sudden impact force is not applied to the second spring 52. The compression spring 68 damps the force applied to the second spring 52 by the first spring 50. The compression spring 68 buffers the second spring 52 from the force of the first spring 50.

After the impact force is absorbed and stored by the compression spring 68, the stress in the compression spring 68 biases the tab 74 to rotate in the belt winding direction A relative to the hub 66. The spring force of the compression spring 68 may be sufficient to cause relative rotation between the hub 66 and the wheel 64 such that the tab 74 is moved out of the spring section 100 and into the tab section 98. After the tab 74 is moved out of the spring section 100, the first end portion 106 of the compression spring 68 rests against the abutment surface 102 (FIG. 3).

Figure 5:
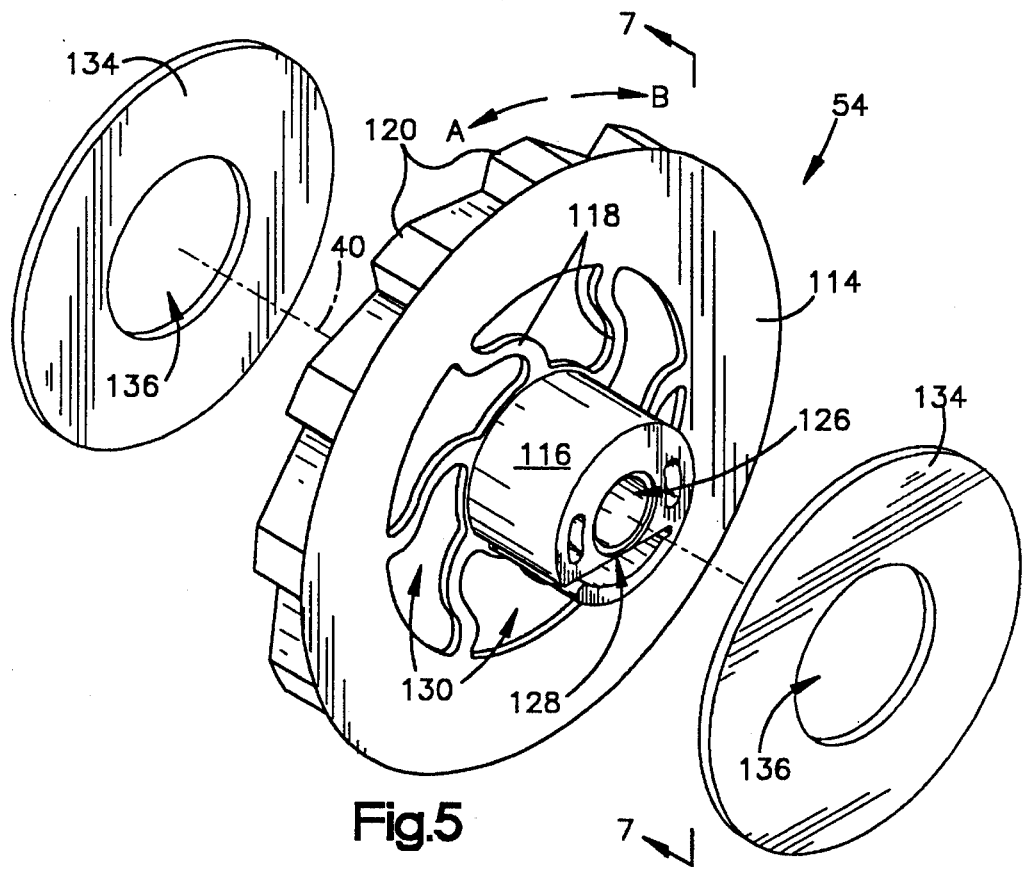
FIG. 5 is an exploded perspective view of a portion of a second embodiment of the present invention, with certain parts removed for clarity.
Figure 6:
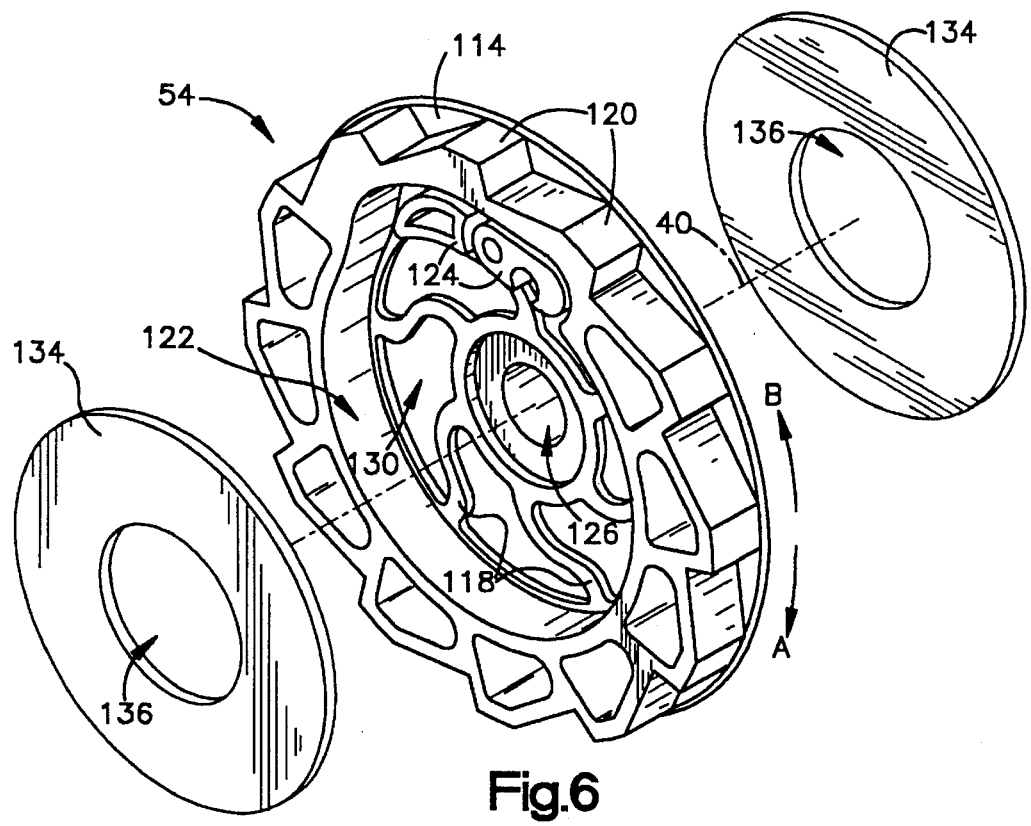
FIG. 6 is a reverse angle exploded perspective view of the parts shown in FIG. 5.
Figure 7:
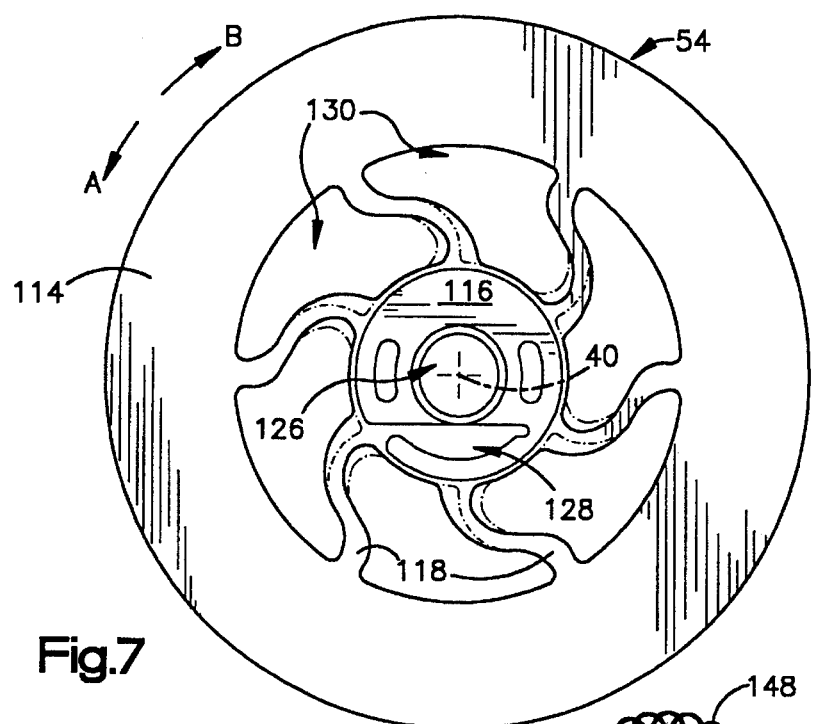
FIG. 7 is a view taken along line 7—7 in FIG. 5 showing two operational positions for a part of the second embodiment.

In a second embodiment (FIGS. 5–7) of the present invention, previously referenced structure is identified by identical reference numbers. In general, the second embodiment only differs from the first embodiment in the structure of the ratchet 54. In the second embodiment, the ratchet 54 includes a wheel 114, a hub 116 and a plurality of resilient spokes 118. The wheel 114 includes a plurality teeth 120 which extend in an annular array about the outer periphery of the wheel 114. The teeth 120 define a hollow interior 22 of the wheel 114 (FIG. 6), which faces toward the spool 114 (FIG. 1).

Located within the hollow interior 122 (FIG. 6) are spring anchor projections 124. The second spring 52 (FIG. 1, not shown in FIGS. 5–7 for clarity) is located concentrically about the shaft 30 and within the hollow interior 122 of the wheel 114. The first end (not shown) of the second spring 52 is affixed to the spring anchor projections 124. Thus, the first end of the second spring 52 is fixed for rotation with the wheel 114.

The hub 116, which is co-axial with the wheel 114, is generally cylindrical in shape and extends along the axis 40 from an axial side of the wheel 114 opposite the teeth 120. The hub 116 has a central aperture 126 through which the shaft extension 32 (FIG. 1) extends. The ratchet 54 is supported on the shaft extension 32 for rotation relative to the shaft extension 32.

The hub 116 has a spring retainer slot 128 (FIG. 5) which extends parallel to the axis 40 and partially through the hub 116 along a geometric chord line. The first spring 50 (FIG. 1, not shown in FIGS. 5–7 for clarity) is located concentrically about the hub 116. The second end (not shown) of the first spring 50 is received in the spring retainer slot 128. Thus, the second end of the first spring 50 is fixed for rotation with the hub 116. The first and second springs 50 and 52 are connected in series, through the ratchet 54, to bias the spool 14 to rotate in the winding direction A.

Six spokes 118 (FIG. 5), which are equally spaced about the axis 40, extend radially inward from the wheel 114 to the hub 116 with gaps 130 between adjacent spokes 118. Preferably, the wheel 114, the hub 116 and the spokes 118 are made of plastic and are molded in one piece. The spokes 118 curve as they extend from the wheel 118 inwardly to the hub 116. The spokes 118 are spring elements and are resiliently flexible (as shown in phantom in FIG. 7) to permit a limited amount of relative rotation between the wheel 114 and the hub 116. When the spokes 118 are not flexed, the spokes 118, the wheel 114 and the hub 116 are in a rest position (shown in solid in FIG. 7).

Two disc-shaped spring liners 134 with central apertures 136 are disposed on opposite sides of the ratchet 54. One of the spring liners 134 is located within the hollow interior 122 defined by the teeth 120. The hub 116 extends through the respective aperture 136 of the other spring liner 134. The spring liners 134 protect the spokes 118 and the first and second springs 50 and 52 by preventing frictional contact and abrasion between the spokes 118 and the first and second springs 50 and 52.

When the belt webbing 16 (FIG. 1) is withdrawn from the spool 14, the spool 14 is rotated in the withdrawal direction B. Rotation of the spool 14 in the withdrawal direction causes the second spring 52 to tighten. As the second spring 52 is tightened, the ratchet 54 is biased to rotate about the axis 40 in the withdrawal direction B. When the ratchet 54 is rotated in the withdrawal direction B, the first spring 50 is stressed. Thus, as the belt webbing 16 is withdrawn, the first and second springs 50 and 52 provide an increasing combined spring force for biasing the spool 14 to rotate in the winding direction A. The ratchet 54 rotates substantially as a unit, without substantial relative rotation between the wheel 114 (FIG. 7) and the hub 116.

When actuated, the blocking mechanism 56 (FIG. 1) blocks rotation of the ratchet 54, as a unit, and prevents the first spring 50 from applying its spring force to bias the spool 14 to rotate in the winding direction A. Thus, the ratchet 54 and the blocking mechanism 56 provide a comfort setting in which only the second spring 52 acts to bias the spool in the winding direction A. When the retractor 10 is in the comfort setting, a reduced tension force is transmitted by the belt webbing 16 to the vehicle occupant because only the second spring 52, which is relatively a weak spring, acts to bias the spool 14.

In operation, the second embodiment operates in a manner similar to the first embodiment of the present invention. When the blocking mechanism 56 releases the rachet 54, the first spring 50 tends to rotate the ratchet 54 in the belt winding direction A. If sufficient stress is present in the first spring 50, the first spring 50 will tend to drive and stress the second spring 52 toward a solid, fully-stressed position. When the second spring 52 reaches its fully-stressed position, further rotation of the wheel 114 is prevented. However, due to the driving force of the first spring 50 and rotational inertia, the hub 116 tends to continue to rotate in the belt winding direction A relative to the wheel 114. During relative rotation between the hub 116 and the wheel 114, the spokes 118 flex or deflect (as shown by the dashed lines in FIG. 7) to absorb and store energy.

Thus, an impact force is not transmitted to the second spring 52. Rather, the impact force is absorbed and stored by the resilient spokes 118. The spokes 118 damp the force of the first spring 50 and buffer the second spring 52. The spokes 118 have sufficient resilience to cause the hub 116 to rotate back, in the belt withdrawal direction B, relative to the wheel 114 after the impact is absorbed.

Figure 8:
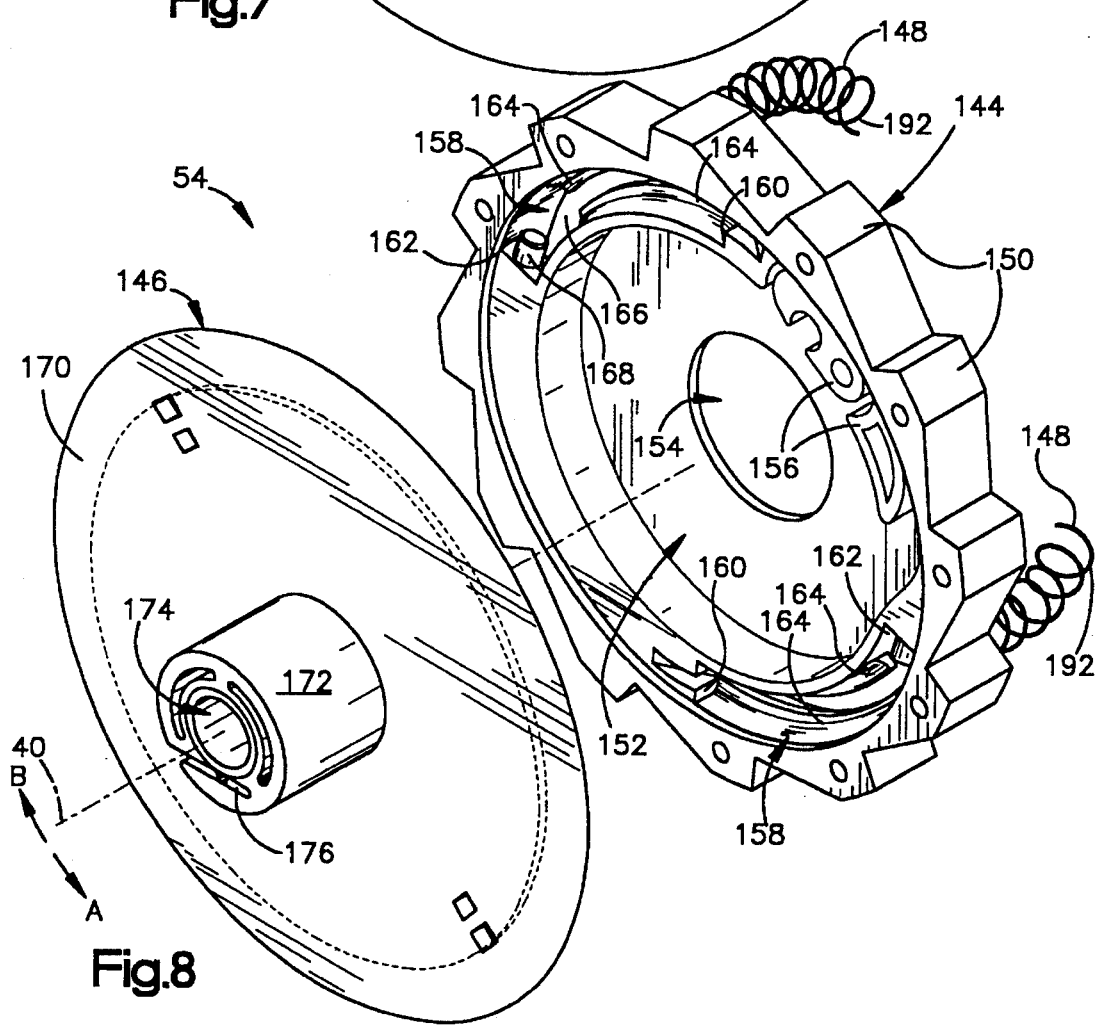
FIG. 8 is an exploded perspective view of a portion of a third embodiment of the present invention, with certain parts removed for clarity.

In a third embodiment (FIGS. 8–12) of the present invention, previously referenced structure is identified by identical reference numerals. In general, the third embodiment only differs from the first and second embodiments in the structure of the ratchet 54. In the third embodiment (FIG. 8), the ratchet 54 includes a wheel 144, a hub 146 and two compression springs 148. The wheel 144 is made of molded plastic and includes a plurality of teeth 150. The teeth 150 extend in an annular array about the outer periphery of the wheel 144 and define a hollow interior 152 for the wheel. The hollow interior 152 faces away from the spool 14 (FIG. 1).

An aperture 154 (FIG. 8) extends through the wheel 144 along the axis 40. Spring anchor projections 156 are located within the hollow interior 152. The second spring 52 (FIG. 1, not shown in FIGS. 8–12 for clarity) is located concentrically about the shaft 30 and within the hollow interior 152. The first end (not shown) of the second spring 52 is connected with the spring anchor projections 154.

The wheel 144 contains two arcuate slots 158 which extend in arc segments at a radial distance from the axis 40. Each arcuate slot 158 has a first end 160 and a second end 162 and an associated arcuate yoke flange 164 (FIG. 9). The arcuate yoke flange 164 extends partially across the width of the arcuate slot 158 and partially along the length of the arcuate slot 158. The arcuate yoke flange 164 terminates at a receiving opening 166 which is located adjacent to the second end 162 of the arcuate slot 158. The second end 162 is partially sloped. A spring retaining pin 168 is located in the arcuate slot 158 at the respective second end 162.

The hub 146 is made of molded plastic, and is coaxial with the wheel 144. The hub 146 has a plate 170 (FIG. 8) and a projection 172. The plate 170 extends in a plane transverse to the axis 40 and has an outer diameter which is substantially the same as an outer diameter of the wheel 144. The projection 172 is generally cylindrical and extends axially from the plate 170 in a direction away from the wheel 144. The projection 172 has a center aperture 174 extending along the axis 40. The shaft extension 32 (FIG. 1) of the spool 14 extends through the aperture 174. The ratchet 54 is supported on the shaft extension 32 for rotation relative to the shaft extension 32.

The projection 172 (FIG. 8) has a spring retainer slot 176 which extends parallel to the axis 40 and partially through the projection 172 along a geometric chord line. The first spring 50 (FIG. 1, not shown in FIGS. 8–12 for clarity) is located concentrically about the projection 172. The first end (not shown) is fixed to the cover 58. The second end (not shown) of the first spring 50 extends into the slot 176. Thus, the second end of the first spring 50 is fixed for rotation with the hub 146.

The hub 146 (FIG. 9) includes two interlock projections 180 disposed at diametrically opposed positions on the plate 170. The interlock projections 180 are located on the axial side of the hub 146 opposite the projection 172 and extend from the plate 170 in directions parallel to the axis 40. Each interlock projection 180 (FIG. 9A) includes a shoulder portion 182, a neck portion 184 and a head portion 186. The neck portion 184 has a width which is less than the shoulder portion 182 and head portion 186.

Each interlock projection 180 extends into a respective one of the arcuate slots 158 (FIG. 10) adjacent to a respective first end 160 of the arcuate slot 158. The head portion 186 of each interlock projection 180 is located on a first axial side of the respective arcuate yoke flange 164 and the shoulder portion 182 is located on a second axial side of the respective arcuate yoke flange 164. Thus, the interlock projections 180 prevent axial movement between the hub 146 and the wheel 144. The hub 146 is rotatable relative to the wheel 144, to a limited extent, as the interlock projections 180 slide along the respective arcuate slots 158.

Figure 11:
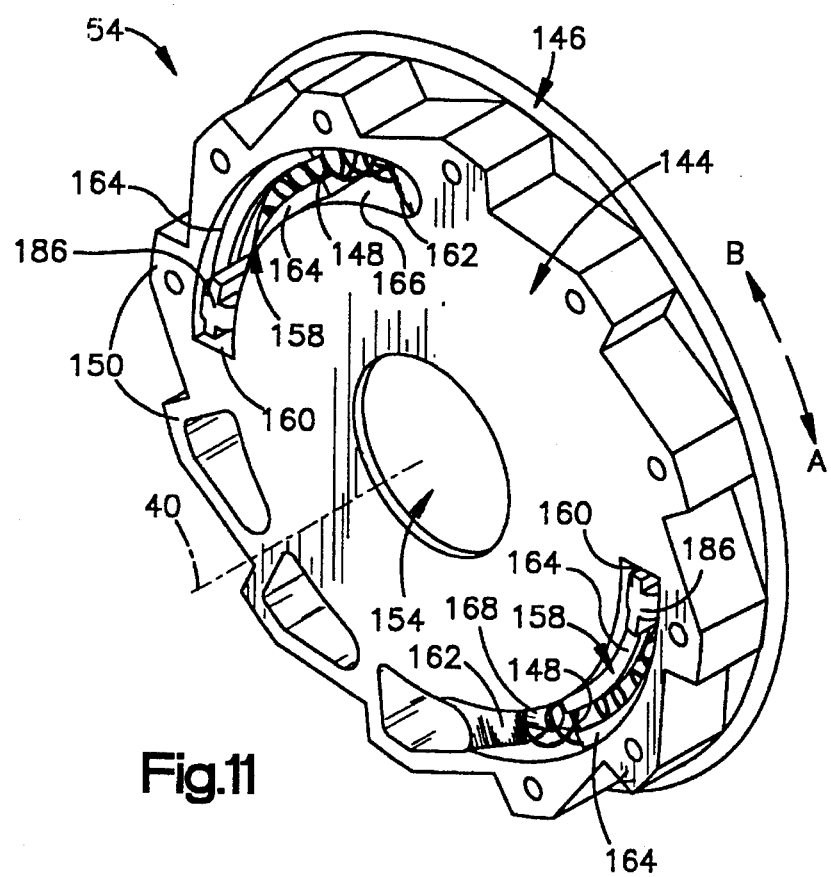
FIG. 11 illustrates the parts shown in FIG. 10 in a first operational position.
Figure 12:
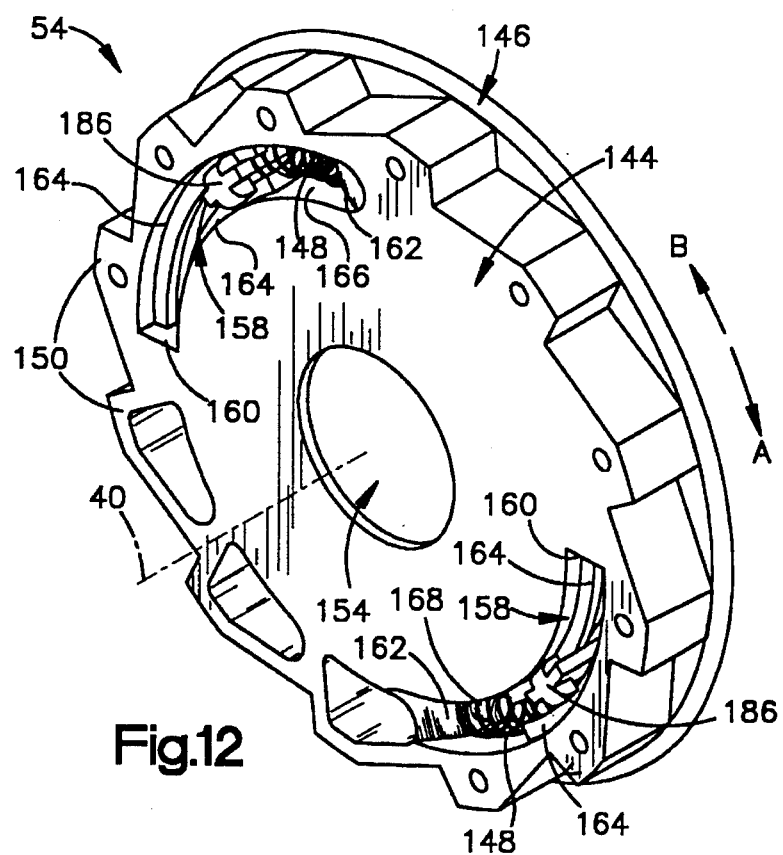
FIG. 12 is a view similar to FIG. 11 showing the parts in a second operational position.

Each of the two compression springs 148 is made of metal coiled into a helix, and has a first end portion 190 and a second end portion 192. Each compression spring 148 is located in a respective one of the arcuate slots 158 (FIG. 10). The first end portion 190 of each compression spring 148 engages the respective interlock projection 180. The second end portion 192 of the compression spring 148 encircles the spring retaining pin 168 and engages the second end 162 of the respective arcuate slot 158. Thus, the compression spring 148 biases the interlock projection 180 toward the first end 160 of the arcuate slot 158. Accordingly, the hub 146 is biased in the belt withdrawal direction B relative to the wheel 144 (FIG. 11).

The ratchet 54 is assembled by axially aligning (FIG. 9) the interlock projections 180 with the receiving openings 166. The wheel 144 and the hub 146 are moved axially until the wheel 144 rests against the plate 170 of the hub 146 and the interlock projections 180 extend through the receiving openings 166 of the respective arcuate slots 158. The hub 146 is rotated (FIG. 10) relative to the wheel 144 in the belt withdraw direction B, to move the interlock projections 180 toward the first ends 160 of the arcuate slots 158. The compression springs 148 are fed along the sloped second ends 162 of the slots 158 into the respective arcuate slots 158 through the receiving openings 166. The end portions 192 of the respective compression springs 148 opposite the interlock projections 180 are positioned about the respective spring retaining pins 168. The compression springs 148 are trapped between the arcuate yoke flanges 164 of the wheel 144 and the plate 170 of the hub 146.

The first and second springs 50 and 52 (FIG. 1) are connected in series, through the ratchet 54, to bias the spool 14 to rotate in the winding direction A. When the belt webbing 16 is withdrawn from the spool 14, the spool 14 is rotated in the withdrawal direction B. Rotation of the spool 14 in the withdrawal direction causes the second spring 52 to tighten.

As the second spring 52 is tightened, the ratchet 54 is biased to rotate about the axis 40 in the withdrawal direction B. When the ratchet 54 is rotated in the withdrawal direction B, the first spring 50 is tightened. Thus, as the belt webbing 16 is withdrawn, the first and second springs 50 and 52 provide an increasing combined spring force for biasing the spool 14 to rotate in the winding direction A. The ratchet 54 rotates substantially as a unit, without substantial relative rotation between the wheel 144 and the hub 146 (FIG. 11).

When actuated, the blocking mechanism 56 (FIG. 1) blocks rotation of the ratchet 54, as a unit, and prevents the first spring 50 from applying its spring force to bias the spool 14 to rotate in the winding direction A. Thus, the ratchet 54 and the blocking mechanism 56 provide a comfort setting in which only the second spring 52 acts to biased the spool in the winding direction A. When the retractor 10 is in the comfort setting, a reduced tension force is transmitted by the belt webbing 16 to the vehicle occupant because only the second spring 52, which is relatively a weak spring, acts upon the spool 14.

In operation, the third embodiment operates in a manner similar to the first embodiment of the present invention. When the blocking mechanism 56 releases the rachet 54, the first spring 54 tends to rotate the ratchet 54 in the belt winding direction A. If sufficient stress is present in the first spring 50, the first spring 50 will tend to drive and tighten the second spring 52 toward a solid, fully-stressed position. When the second spring 52 reaches its fully-stressed position, further rotation of the wheel 144 is prevented. However, due to the driving force of the first spring 50 and rotational inertia, the hub 146 tends to continue to rotate in the belt winding direction A relative to the wheel 144. During relative rotation between the hub 146 and the wheel 144, the interlock projections 180 push on the compression springs 148. The compression springs 148 are compressed to absorb and store energy.

Thus, an impact force is not transmitted to the second spring 52. Rather, the impact force is absorbed and stored by the compression springs 148. The compression springs 148 damp the force of the first spring 50 and buffer the second spring 52. After the impact force is absorbed and stored by the compression springs 148, the stress in the compression springs 148 bias the hub 146 in the belt withdrawal direction B relative to the wheel 144.

From the above description of the invention, those skilled in the art will perceive improvements, changes and modifications. Such improvements, changes and modifications within the skill of the art are intended to be covered by the appended claims.

Having described the invention, the following is claimed:

1. A seat belt retractor for storing seat belt webbing, said retractor comprising:

a webbing storage spool supported for rotation about an axis in seat belt retraction and seat belt withdrawal directions;

first and second springs for biasing the spool in the seat belt retraction direction; and means for blocking a spring force of said first spring from acting on said spool including an intermediate connector interconnecting said first and second springs;

said intermediate connector having a first portion connected to said first spring, a second portion movable relative to said first portion and connected to said second spring, and means for absorbing energy upon relative movement of said first and second portions.

2. A retractor as set forth in claim 1, wherein said intermediate connector is rotatable about the axis of rotation of said storage spool.

3. A seat belt retractor for storing seat belt webbing for restraining a vehicle occupant, said retractor comprising:

a seat belt webbing storage spool supported for rotation about an axis in belt retraction and belt withdrawal directions;

first and second springs in series which bias the spool for rotation in the belt retraction direction;

a rotatable connector interconnecting said first and second springs, said connector having first and second portions movable relative to each other, said first portion being connected to said first spring and said second portion being connected to said second spring; and actuatable means for, when actuated, blocking rotation of said second portion of said connector in the belt retraction direction to block the spring force of said first spring from acting through said second spring and on said spool and for, when deactivated, releasing said second portion of said connector to permit said first spring to apply force through said connector and said second spring to said spool;

said connector including means acting between said first and second portions for damping the force applied through said second spring by said first spring upon deactivation of said actuatable means, said means acting between said first and second portions comprises a spring.

4. A seat belt retractor for storing seat belt webbing for restraining a vehicle occupant, said retractor comprising:

a seat belt webbing storage spool supported for rotation about an axis in belt retraction and belt withdrawal directions;

first and second springs in series which bias the spool for rotation in the belt retraction direction;

a rotatable connector interconnecting said first and second springs, said connector having first and second portions movable relative to each other, said first portion being connected to said first spring and said second portion being connected to said second spring; and actuatable means for, when actuated, blocking rotation of said second portion of said connector in the belt retraction direction to block the spring force of said first spring from acting through said second spring and on said spool and for, when deactivated, releasing said second portion of said connector to permit said first spring to apply force through said connector and said second spring to said spool;

said connector including means acting between said first and second portions for damping the force applied through said second spring by said first spring upon deactivation of said actuatable means;

said first portion of said connector comprises a hub, said second portion of said connector comprises a wheel having a plurality of teeth, said hub and said wheel being co-axial.

5. A retractor as set forth in claim 4, wherein said wheel includes a spindle and a tab, said hub being rotatably mounted on said spindle, said means acting between said first and second portions comprises a compression spring which engages a portion of said hub and said tab for biasing said hub relative to said wheel.

6. A retractor as set forth in claim 5, wherein said hub has a slot, said tab being located in said slot and being slidable relative to said hub along said slot.

7. A seat belt retractor for storing seat belt webbing for restraining a vehicle occupant, said retractor comprising:

a seat belt webbing storage spool supported for rotation about an axis in belt retraction and belt withdrawal directions;

first and second springs in series which bias the spool for rotation in the belt retraction direction;

a rotatable connector interconnecting said first and second springs, said connector having first and second portions movable relative to each other, said first portion being connected to said first spring and said second portion being connected to said second spring; and actuatable means for, when actuated, blocking rotation of said second portion of said connector in the belt retraction direction to block the spring force of said first spring from acting through said second spring and on said spool and for, when deactivated, releasing said second portion of said connector to permit said first spring to apply force through said connector and said second spring to said spool;

said connector including means acting between said first and second portions for damping the force applied through said second spring by said first spring upon deactivation of said actuatable means;

wherein said first portion of said connector comprises a hub, said second portion of said connector comprises a wheel, said means acting between said first and second portions including a resilient, flexible spoke extending between said hub and said wheel.

8. A retractor as set forth in claim 7, wherein said hub, said wheel and said spoke are formed in one piece.

9. A retractor as set forth in claim 7, wherein said spoke is elastically deformable.

10. A retractor as set forth in claim 7, wherein said spoke has an arcuate shape.

11. A seat belt retractor for storing seat belt webbing for restraining a vehicle occupant, said retractor comprising:

a seat belt webbing storage spool supported for rotation about an axis in belt retraction and belt withdrawal directions;

first and second springs in series which bias the spool for rotation in the belt retraction direction;

a rotatable connector interconnecting said first and second springs, said connector having first and second portions movable relative to each other, said first portion being connected to said first spring and said second portion being connected to said second spring; and actuatable means for, when actuated, blocking rotation of said second portion of said connector in the belt retraction direction to block the spring force of said first spring from acting on said spool and for, when deactivated, releasing said second portion of said connector to permit said first spring to apply force through said connector and said second spring to said spool;

said connector including means acting between said first and second portions for damping the force applied by said first spring upon deactivation of said actuatable means.

12. A retractor as set forth in claim 11, wherein said first and second springs comprise coil springs, said first spring having a first end attached to a retractor housing element and a second end attached to said first portion of said connector, said second spring having a first end attached to said second portion of said connector and a second end attached to a portion rotatable with said spool, said first spring, said connector and said second spring being in series between said retractor housing element and said spool.

13. A retractor as set forth in claim 11, wherein said connector includes a hub and a wheel with a plurality of teeth, said hub and said wheel being co-axial and being interconnected.

14. A retractor as set forth in claim 13, wherein said hub includes a plate which has a projection, said wheel having an arcuate slot, said projection extending into said arcuate slot.

15. A retractor as set forth in claim 14, wherein said means acting between said first and second portions biases said projection toward one end of said arcuate slot.

16. A retractor as set forth in claim 14, wherein said means acting between said first and second portions is a compression spring which engages said wheel and said projection.

17. A retractor as set forth in claim 14, wherein said projection has a portion which interfits with said wheel for preventing axial separation of said hub and wheel.

18. A seat belt retractor for storing seat belt webbing, said retractor comprising:

a webbing storage spool supported for rotation about an axis in seat belt retraction and seat belt withdrawal directions;

first and second springs for biasing the spool in the seat belt retraction direction; and means for blocking a spring force of said first spring from acting on said spool including an intermediate connector interconnecting said first and second springs;

said intermediate connector having a first portion connected to said first spring, a second portion movable relative to said first portion and connected to said second spring, and means for absorbing energy upon relative movement of said first and second portions, said means for absorbing energy is stressed during relative movement between said first and second portions in a first direction and provides a force for biasing said first and second portions to move relative to each other in a second direction.

19. A retractor as set forth in claim 18, wherein said means for absorbing energy includes a spring element which extends between said first and second portions of said intermediate connector.

20. A retractor as set forth in claim 19, wherein said spring element comprises a coil spring.

21. A retractor as set forth in claim 19, wherein said spring element comprises a deflectable member.

* * * * *